May 13, 1969     W. A. BIERMANN     3,443,693
OIL CONTROL VALVE STRAINER ARRANGEMENT
Filed Feb. 23, 1967
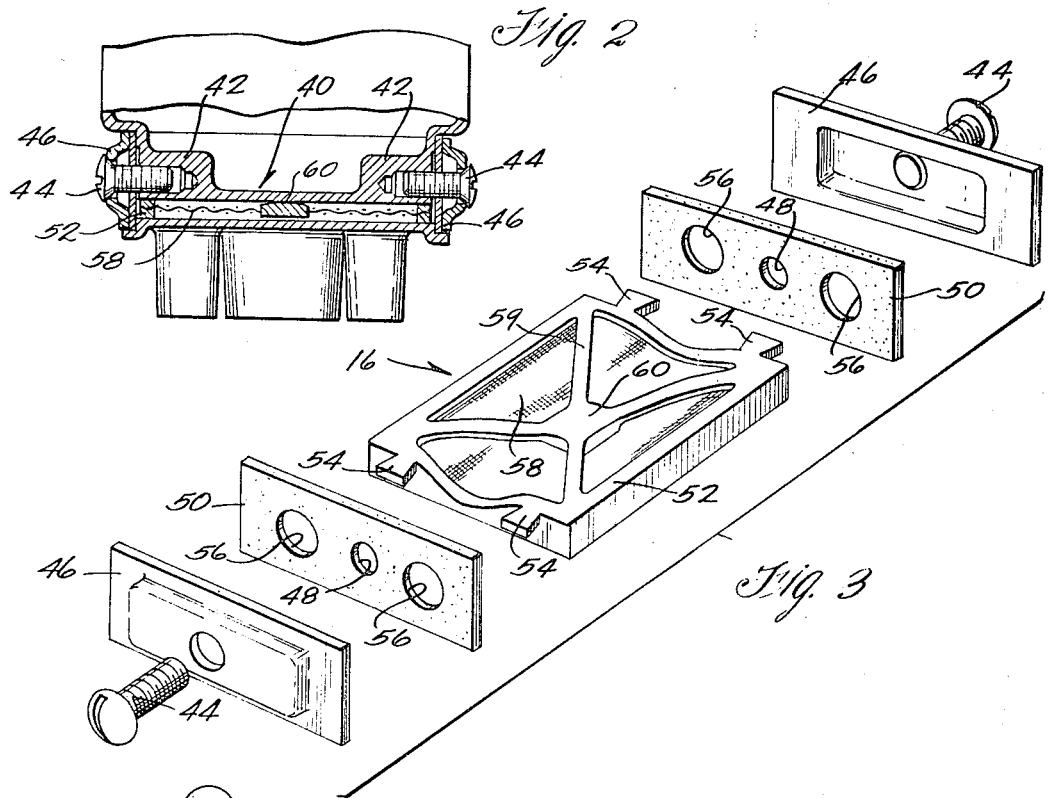
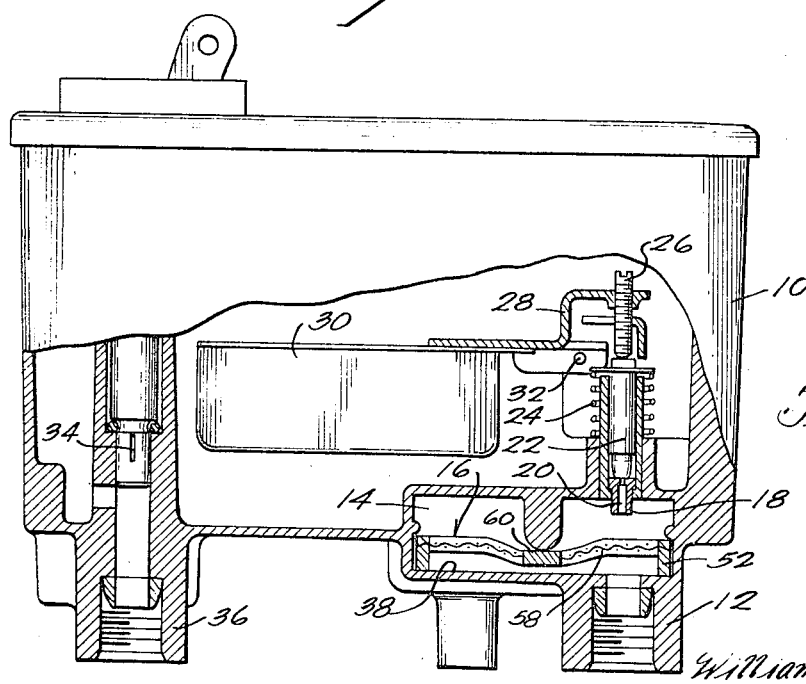
Inventor
William A. Biermann
By Bayard H. Michael
Attorney United States Patent Office 3,443,693
Patented May 13, 1969

1

3,443,693
OIL CONTROL VALVE STRAINER
ARRANGEMENT
William A. Biermann, Brookfield, Wis., assignor to Controls Company of America, Melrose Park, Ill., a corporation of Delaware
Filed Feb. 23, 1967, Ser. No. 618,074
Int. Cl. B01d 29/04, 39/12
U.S. Cl. 210—123                                    4 Claims

ABSTRACT OF THE DISCLOSURE

The flat strainer at the inlet to the oil control valve can be removed from either side of the valve body. The internal rib holds the strainer frame flat against the flat floor of the cavity and during removal of the frame accumulated sediment will be scraped out of the cavity.

Background of invention

The strainer heretofore provided in oil control valves has been a long tubular screen mounted in a cavity on the longitudinal axis of the body. This necessitated allowing considerable clearance at the end of the body for servicing the strainer. In the case of smaller heaters this resulted in undesirable restrictions on the heater manufacturer as to location and size of access doors, clearance to walls, etc.

Summary of invention

The provision of a flat strainer removable from either side of the valve body eliminates the need for endwise clearance around the valve body. Since no particular orientation is required by the strainer the heater manufacturer has greater choice of location for the inlet and outlet pipes. The frame of the strainer is designed to scrape accumulated sediment out of the cavity so removal of the strainer removes as much sediment as with the tubular type which collects the sediment inside the tube. The frame is designed to be held flat in position to eliminate leakage around the frame.

Description of drawings

FIG. 1 is a vertical section through an oil control valve with the strainer in position;

FIG .2 is a fragmentary vertical section through the strainer; and

FIG. 3 is a perspective showing the strainer in greater detail.

Description of preferred embodiment

The oil control valve body 10 is provided with an inlet 12 leading to chamber 14 in which the strainer 16 is mounted. Oil flows into the body through the inlet and through the strainer to fitting 18 having the orifice 20 against which the tip of needle valve 22 seats. The valve is biased open by spring 24 and the adjustable screw 26 threaded into bracket 28 transmits motion of the float 30 to the valve. The float is pivoted at 32. The metering stem 34 is regulated either manually or thermostatically to control flow through the outlet 36. It is important to keep sediment entrained in the oil out of the valve seating surfaces in order to maintain the uniformity of operation of the oil control valve. It is for this reason that the strainer 16 is provided.

It will be noted that the floor 38 of the strainer chamber

2

14 is flat and that the chamber runs through the body. The top of the chamber is cast to include the transverse rib or boss 40 which includes a boss 42 at each end. Each boss 42 is internally threaded to receive the retaining screws 44 which are preferably the type including a gasket material on the underside of the head to seal as well as retain. Each retaining screw passes through a retaining cap 46 and the central orifice 48 in gasket 50 to thereby seal the cap against the valve body. The retaining screws do not connect to the frame 52 of the strainer. The frame is merely captured between the two gaskets. If the frame is slightly off center the handle-like projections 54 on each end can project into the larger holes 56 in the gasket 50.

These handle-like projections serve two functions, one being to aid in removal of the strainer after the cap 46 is removed. Another very important function of the handles is to aid in the molding process. Thus the very fine mesh screen 58 is placed in a mold and then the plastic frame is molded around the screen. Since the mesh is extremely fine there would be no assurance of proper passage of the plastic during the molding process without the handles. Therefore, the handles are formed on the ends of the frames so as to extend below the plane of the mesh and provide an unimpeded plastic flow path around the end of the screen, assuring proper distribution of the plastic.

The frame ends between the handles 54 are curved downwardly to pass under the bottom side of boss 40. Since the side rails of the frame are not so formed the frame cannot be placed in the control valve body 90° out of orientation or upside down. The frame also includes the diagonal ribs 59 leading to the central pad 60 and when the frame is relaxed (that is, not mounted in the valve body) the top surface of the central pad is vertically above the bottom of the frame a greater distance than the depressed ends of the frame between the handles. Thus the principal contact with the boss will occur at central pad 60. The pad is also slightly curved (as appears in FIG. 2) to give a camming action as the frame is inserted into the chamber. The dimensions are selected so the pad will be pressed downwardly as the frame is inserted into the chamber. This imparts a resilient force to the frame holding the peripheral edge of the frame flat against the flat floor 38 of the chamber. This eliminates leakage around the frame bypassing the mesh and further holds the frame flat against the flat floor as the frame is removed so that accumulated sediment scattered at random on the flat floor of the cavity will be scraped out of the oil control body as the frame is removed for servicing.

With this arrangement no endwise clearance is required for installation of the oil control valve and the strainer can be removed from either side of the valve body. The strainer could be mounted in a vertical plane but this has the disadvantage of increasing the length of the control valve body as well as letting sediment then accumulate towards the bottom of the vertical cavity and increasing the problem of sediment removal. Similarly, endwise rather than sidewise movement of the horizontal strainer is not as desirable since it requires additional clearance.

I claim:

1. In an oil control valve having an elongated body and an inlet and an outlet with a float chamber containing a float regulating an inlet valve, a generally horizontal chamber located transversely in the body between the inlet and the inlet valve and extending through the valve body with the opposed ends of the chamber being open, closure plates at each open end of the chamber together with means retaining each closure plate in position independently of the other, a generally planar strainer in the chamber and including a frame carrying a mesh screen, said frame being held against a surface of the chamber with the seating surface of the frame and the chamber surface being generally complementary and constructed and arranged to cause flow through the inlet to pass through the screen and not between the frame and the chamber, a boss in the chamber, the strainer frame including a central pad which is connected to the frame by ribs, said pad being depressed by the boss to urge the frame against the chamber surface when the frame is in position in the chamber, the frame including depressions in the ends thereof aligned with the boss and constructed to pass under the boss to insure proper orientation of the frame in the chamber during insertion thereof in said opening, and said strainer being constructed and arranged to scrape accumulated sediment from the chamber surface upon removal of the strainer from the chamber.

2. An oil control valve according to claim 1 including handle-like projections on each end of the frame, said handles extending vertically to both sides of the screen to facilitate material flow during molding of the frame to the screen.

3. An oil control valve according to claim 1 in which the strainer chamber is generally horizontal and extends through the valve body with closure plates at each open end of the chamber, said strainer frame having diagonal interconnected ribs, the means holding the frame against the surface comprising means for deflecting the ribs towards the surface in the region of the interconnection of the ribs.

4. An oil control valve according to claim 3 in which the last named means comprises a boss projecting from the chamber surface opposite the seating surface thereof and extending substantially the length of the chamber.

References Cited

UNITED STATES PATENTS 2,261,234  11/1941  De Lancey _____ 137—411 X

FOREIGN PATENTS 322,969  5/1902  France.
491,751  3/1954  Italy.

REUBEN FRIEDMAN, *Primary Examiner.*

T. A. GRANGER, *Assistant Examiner.*

U.S. Cl. X.R.

137—550; 210—128, 236, 407, 445, 447, 455, 499